United States Patent
Choi (10) Patent No.: US 7,834,885 B2
(45) Date of Patent: Nov. 16, 2010

(54) DISPLAY APPARATUS AND IMAGE PROCESSING METHOD THEREOF

(75) Inventor: Kyoung-oh Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 629 days.

(21) Appl. No.: 11/746,074

(22) Filed: May 9, 2007

(65) Prior Publication Data
US 2008/0079745 A1 Apr. 3, 2008

(30) Foreign Application Priority Data
Sep. 29, 2006 (KR) ............... 10-2006-0095495

(51) Int. Cl.
*G09G 5/02* (2006.01)
(52) U.S. Cl. ............... 345/589; 345/590; 345/603
(58) Field of Classification Search ............... 345/593, 345/594, 600, 589, 590
See application file for complete search history.

(56) References Cited

U.S. PATENT DOCUMENTS

| | | | |
|---|---|---|---|
| 5,666,207 A | 9/1997 | Ohmura | |
| 6,437,792 B1* | 8/2002 | Ito et al. | 345/600 |
| 6,510,995 B2* | 1/2003 | Muthu et al. | 235/454 |
| 6,549,654 B1* | 4/2003 | Kumada | 382/162 |
| 6,765,585 B2* | 7/2004 | Wada | 345/589 |
| 7,061,503 B2* | 6/2006 | Newman | 345/593 |
| 7,129,957 B2* | 10/2006 | Kim | 345/603 |
| 7,212,635 B2* | 5/2007 | Nishikawa | 380/213 |
| 7,283,181 B2* | 10/2007 | Allen et al. | 348/744 |
| 7,377,657 B2* | 5/2008 | Morejon et al. | 353/85 |
| 7,391,475 B2* | 6/2008 | Pate et al. | 348/602 |
| 7,453,599 B2* | 11/2008 | Kim | 358/1.9 |
| 2001/0012396 A1 | 8/2001 | Kumada | |
| 2003/0184812 A1* | 10/2003 | Minakuti et al. | 358/296 |
| 2003/0227490 A1 | 12/2003 | Kim | |
| 2004/0212783 A1* | 10/2004 | Wada | 353/31 |
| 2005/0100211 A1* | 5/2005 | Gibson et al. | 382/162 |
| 2005/0219561 A1* | 10/2005 | Haikin | 358/1.9 |
| 2005/0253866 A1 | 11/2005 | Kim et al. | |

(Continued)

FOREIGN PATENT DOCUMENTS

EP 1 152 322 A2 11/2001

(Continued)

OTHER PUBLICATIONS

Extended European Search Report issued Jun. 1, 2010 in counterpart European Application No. 07112429.1.

*Primary Examiner*—M Good Johnson
(74) *Attorney, Agent, or Firm*—Sughrue Mion, PLLC (57) ABSTRACT

A display apparatus using a light emitting diode (LED) light source is provided. The display apparatus including an input unit which includes at least one shortcut key, a storage unit which stores at least one color gamut profile capable of being expressed by the LED light source, a detector which detects a color gamut profile from the storage unit if the color gamut profile is selected using the shortcut key, a converter which converts image data according to the detected color gamut profile, and an output unit which displays the converted image data using a light beam emitted from the LED light source. Accordingly, a user can easily apply a desired color gamut profile to an image and view the image.

14 Claims, 6 Drawing Sheets

U.S. PATENT DOCUMENTS

| | | | |
|---|---|---|---|
| 2006/0274286 A1* | 12/2006 | Morejon et al. | 353/85 |
| 2006/0285136 A1* | 12/2006 | Shin et al. | 358/1.9 |
| 2007/0183656 A1* | 8/2007 | Kuwahara et al. | 382/162 |
| 2007/0230777 A1* | 10/2007 | Tamagawa | 382/162 |
| 2007/0296875 A1* | 12/2007 | Allen et al. | 348/743 |

FOREIGN PATENT DOCUMENTS

| | | |
|---|---|---|
| EP | 1 420 576 A1 | 5/2004 |
| GB | 2 423 663 A | 8/2006 |

* cited by examiner

DISPLAY APPARATUS AND IMAGE PROCESSING METHOD THEREOF

CROSS-REFERENCE TO RELATED APPLICATIONS

This application claims priority under 35 U.S.C. §119(a) of Korean Patent Application No. 10-2006-0095495, filed in the Korean Intellectual Property Office on Sep. 29, 2006, the entire disclosure of which is incorporated herein by reference.

BACKGROUND OF THE INVENTION

1. Field of the Invention

An apparatus and a method consistent with the present invention relate to a display apparatus and a display method thereof, and, more particularly, to a display apparatus which detects a pre-stored color gamut profile using a shortcut key and converts and outputs image data according to the color gamut, and an image processing method thereof.

2. Description of the Related Art

Due to developments in electronic technologies, small-sized portable devices, such as digital cameras have become widespread. Images can be captured using a variety of portable devices, such as cell phones and the like, which have an image capture function.

Image data captured by the image capture devices, such as a digital camera, is displayed using a display apparatus. In this case, display apparatus in the related art display image data using the color gamut profile of the image data and, thus, a user may not have control of the colors displayed.

In order to display the image in a desired color, the user may need to execute a program to check color gamut profiles of the display apparatus and convert image data according to a desired color gamut profile.

In general, a color measuring device called a calibrator measures the black and white level of a currently displayed image and compares the measured value with a value determined in a color gamut profile desired by a user. If there is a difference between the two values, the setting of the display apparatus is calibrated to that of the color gamut profile.

Calibration generally takes a few minutes to a few dozen minutes. Using this method, a user must have an external device such as the calibrator and a program to carry out the calibration in order to watch an image using the desired color gamut profile. Additionally, the process requires a substantial amount of time.

Because particular color gamut profiles such as the Adobe RGB are commonly used, such problems may arise frequently.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, an aspect of the present invention is to provide a display apparatus which detects a pre-stored color gamut profile using a shortcut key and converts and outputs image data according to the color gamut and an image processing method thereof, so that a user can easily apply a desired color gamut profile to an image and view the image.

According to an aspect of the present invention, a display apparatus using a light emitting diode (LED) light source is provided comprising an input unit which comprises at least one shortcut key, a storage unit which stores at least one color gamut profile capable of being expressed by the LED light source, a detector which detects a color gamut profile from the storage unit if the color gamut profile is selected using the shortcut key, a converter which converts image data according to the detected color gamut profile, and an output unit which displays the converted image data using a light beam emitted from the LED light source.

The LED light source may comprise a plurality of red (R), green (G), and blue (B) LED light sources, and the output unit may display the converted image data by adjusting the optical power of the plurality of R, G, and B LED light sources.

The detector may detect the color gamut profile corresponding to the shortcut key from the storage unit if the shortcut key is selected from among the at least one shortcut key.

Alternatively, the detector may detect one of the at least one color gamut profiles stored in the storage unit in succession, whenever a shortcut key is selected from among the at least one shortcut key.

The display apparatus may further comprise an on screen display (OSD) generator which generates an OSD to select a color gamut profile to apply when outputting the image data and display the OSD using the output unit, if the shortcut key is selected, wherein the detector detects a color gamut profile if the color gamut profile is selected from the OSD.

The storage unit may store an Adobe RGB profile.

Alternatively, the storage unit may store at least two of a standard RGB (sRGB) profile, a Bruce RGB profile, a Commission Internationale de l'Eclairage (CIE) RGB profile, and the Adobe RGB profile.

The input unit may comprise at least two shortcut keys corresponding to the at least two color gamut profiles stored in the storage unit.

According to another aspect of the present invention, a method for processing an image in a display apparatus using an LED light source is provided comprising (a) selecting a color gamut profile using at least one shortcut key mounted on the display apparatus, (b) detecting the selected color gamut profile from a storage unit which stores at least one color gamut profile capable of being expressed by the LED light source, (c) converting image data according to the detected color gamut profile, and (d) displaying the converted image data.

The LED light source may comprise a plurality of R, G, and B LED light sources, and in step (d), the converted image data may be displayed by adjusting the optical power of the plurality of R, G, and B LED light sources.

The storage unit may store at least one color gamut profile corresponding to the at least one shortcut key, and in step (b), a color gamut profile corresponding to a shortcut key may be detected from the storage unit if the short cut key is selected from among the at least one shortcut key.

Alternatively, in step (b), the at least one color gamut profile stored in the storage unit may be detected sequentially, whenever a shortcut key is selected from among the at least one shortcut key.

Alternatively, step (a) comprises displaying an OSD to select a color gamut profile to apply when outputting the image data, if a shortcut key is selected from among the at least one shortcut key and displaying a cursor on the OSD and selecting a color gamut profile where the cursor is located, and in step (b), the color gamut profile selected on the OSD is detected from the storage unit.

The storage unit may store an Adobe RGB profile.

Alternatively, the storage unit may store at least two of an sRGB profile, a bruce RGB profile, a CIE RGB profile and the Adobe RGB profile, and the display apparatus comprises at least two shortcut keys corresponding to the at least two color gamut profiles.

BRIEF DESCRIPTION OF THE DRAWINGS

The above and/or other features of the present invention will become more apparent by describing in detail exemplary embodiments thereof with reference to the attached drawing figures, wherein.

DETAILED DESCRIPTION OF THE EXEMPLARY EMBODIMENTS OF THE PRESENT INVENTION

Reference will now be made in detail to the present exemplary embodiments of the present invention, examples of which are illustrated in the accompanying drawings, wherein like reference numerals refer to the like elements throughout. The exemplary embodiments are described below in order to explain the various aspects of the present invention by referring to the figures.

Figure 1:
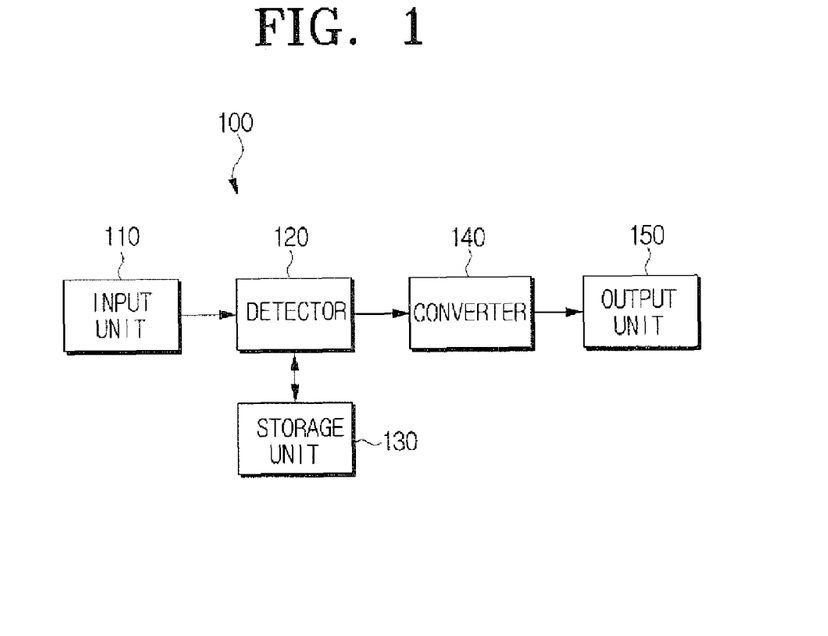
FIG. 1 is a block diagram illustrating the configuration of a display apparatus according to an exemplary embodiment of the present invention.

FIG. 1 is a block diagram illustrating the configuration of a display apparatus according to an exemplary embodiment of the present invention. The display apparatus 100 comprises an input unit 110, a detector 120, a storage unit 130, a converter 140, and an output unit 150. The display apparatus 100 may be configured as a monitor, a television set, or a personal computer consisting of a monitor and a main body. If the display apparatus 100 is a personal computer, the output unit may be a monitor.

The display apparatus 100 may use a light emitting diode (LED) light source to display images. That is, if the output unit 150 of the display apparatus 100 is embodied as a liquid crystal display (LCD) panel (not shown), a light source is required, such as a backlight unit, behind the LCD panel to display images using an LCD. The light source may comprise a cold cathode fluorescent lamp (CCFL) light source or an LED light source.

An LED light source is generally formed with a plurality of LEDs aligned in rows and columns. Each LED may be red (R), green (G) or blue (B), or an LED of another color. Each LED is connected to a scan electrode and a sustain electrode. Power is supplied to each LED through the scan electrode and sustain electrode, so each LED is turned on and off individually. The operation of controlling an LED light source comprises, in the order in which they are used, an addressing section which determines the LEDs to be used for to emitting light, a sustain discharge section which emits light from the determined LEDs and maintains light emission for a certain time period, and a reset section which initiates the LED addressing state. The configuration and operation of an LED light source are already open to the public, so detailed description is omitted here.

An LED light source supports a color expression area 40% wider than an existing CCFL light source. Accordingly, the display apparatus 100 using an LED light source expresses color gamut profiles, such as Adobe RGB, on screen. The Adobe RGB is a color space defined by Adobe Photoshop 5.0, which has a color gamut wider than standard RGB (sRGB), encompasses most of the colors achievable on CMYK color printers, and expresses almost all of the color information of the image.

The input unit 110 comprises at least one shortcut key. The shortcut key facilitates the selection of a color gamut profile.

The storage unit 130 comprises at least one color gamut profile. The color gamut profile is information to determine the output features when outputting an image. The color gamut profile may be one of an sRGB profile, a bruce RGB profile, a Commission Internationale de l'Eclairage (CIE) RGB profile, or an Adobe RGB profile. Each color gamut profile may comprise a range of a color gamut and a register value to set particular values as a white correction value, a gamma correction value and the like. The display apparatus 100 can express images in a wide gamut such as an Adobe RGB by using an LED light source.

The detector 120 detects a color gamut profile selected using the shortcut key on the input unit 110 from the storage unit 130.

The converter 140 converts image data according to the detected color gamut profile. In more detail, the converter 140 adjusts the white balance, the luminance and the like using a register value set in the color gamut profile, compensates gamma features, and also, converts the color gamut of the original image data into the color gamut set in the color gamut profile.

The color gamut refers to the subset of colors which can be represented in display devices such as a monitor, and generally has the same meaning as a color space. The color gamut can be expressed with RGB (red, green and blue), CMYK (cyan, magenta, yellow and black) or the like. The RGB color space may be sRGB, Adobe RGB, bruce RGB, CIE RGB and the like, among which sRGB represents a color space for monitors for Windows and is similar to a color space for general color televisions. sRGB is a standard color space for images on web pages, and has a narrow color gamut, and especially a narrow blue gamut.

The color reproduction range (CRR) for each color gamut is measured by calculating the area of a triangle having summits of each coordinate of the three primary colors measured in a CIE chromaticity diagram, and is used as an index to indicate how many different colors can be expressed. Generally, as the area of the triangle gets broader, a greater variety of colors can be expressed. For this reason, Adobe RGB is now widely used.

The output unit 150 outputs image data converted by the converter 140. In this case, the output unit 150 may comprise the LED light source and an LCD display panel. Accordingly, images are displayed using light beams provided from the LED light source. More specifically, images are expressed in a selected color gamut profile by adjusting the optical power of each color LED in the LED light source according to the converted image data, and changing the chromaticity. The output unit 150 adjusts the optical power by adjusting the driving duration of color LEDs such as RGB LEDs or adjusting the intensity of the driving voltage.

Accordingly, if an Adobe RGB profile is selected through the input unit 110, images are displayed using an Adobe RGB profile.

The image data may be received from an external image capture device or read out from a separate memory (not shown). The configuration for receiving image data is known already, so detailed description is omitted.

Furthermore, the shortcut key mounted on the input unit 110 may be designed to match each color gamut profile.

Figure 2:
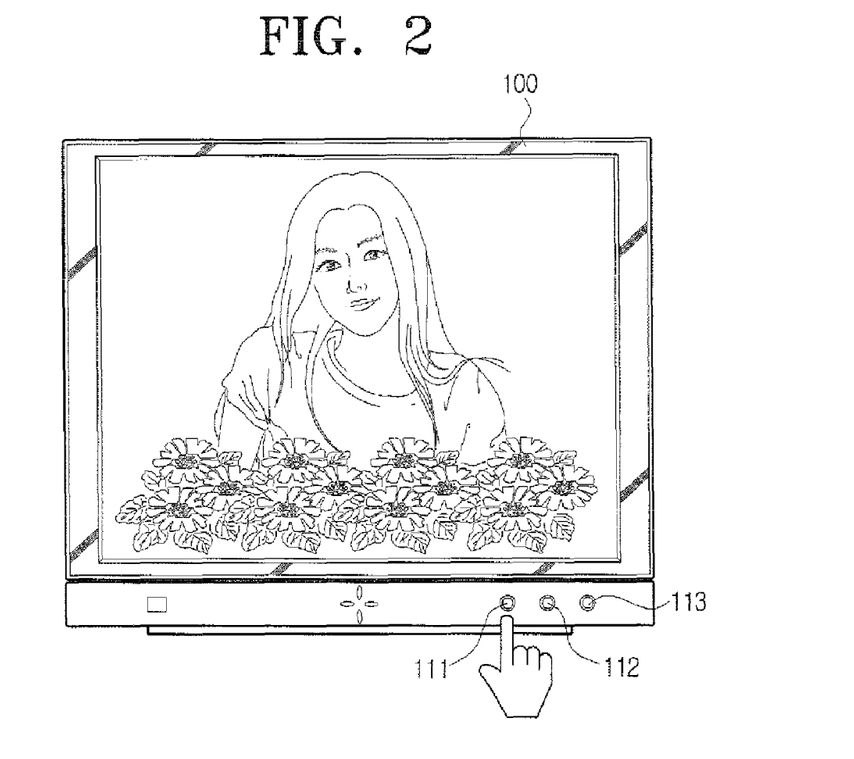
FIG. 2 is a view provided for describing an image converting process of the display apparatus of FIG. 1.

FIG. 2 is a view provided for describing an image converting process of the display apparatus comprising shortcut keys matching each color gamut profile. In FIG. 2, shortcut keys 111, 112 and 113 are mounted on one side of the display apparatus 100. The first shortcut key 111 corresponds to Adobe RGB, the second shortcut key 112 corresponds to sRGB, and the third shortcut key 113 corresponds to CIE RGB.

As shown in FIG. 2, if a user selects the first shortcut key 111, the detector 120 detects profile information regarding Adobe RGB from the storage unit 130, the converter 140 converts image data according to the detected profile information, and the output unit 150 outputs the converted image data. Accordingly, image data is applied and displayed with a desired color gamut profile by a single manipulation of the shortcut keys 111, 112 and 113. FIG. 2 shows the three shortcut keys 111, 112 and 113, but the display apparatus may be implemented with either a single shortcut key corresponding to Adobe RGB or with several shortcut keys.

Alternatively, a shortcut key according to another exemplary embodiment of the present invention may be used as an element to input a color gamut profile conversion command. That is, whenever the shortcut key is selected, the detector 120 detects the pre-stored color gamut profiles one after another and provides the detected color gamut to the converter 140. If sRGB, Adobe RGB, Bruce RGB, and CIE RGB are stored, whenever the shortcut key is pressed, the color gamut to display an image may be converted following the order Adobe RGB→Bruce RGB→CIE RGB→sRGB.

Figure 3:
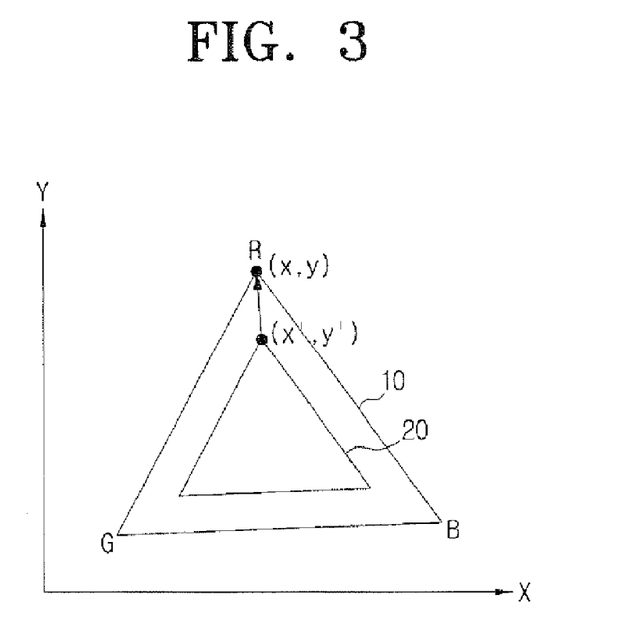
FIG. 3 is a view provided for describing a color gamut converting process.

FIG. 3 is a graph showing a color gamut converting process of the display apparatus 100 to convert an image from sRGB to Adobe RGB in a CIE-XY chromaticity diagram. The CIE-XY chromaticity diagram plots the X-axis and Y-axis of the components of a CIE standard colorimetric system. The CIE standard colorimetric system is established by CIE and represents RGB having three primary colors of light in an amount of X, Y and Z.

As shown in FIG. 3, an Adobe RGB color gamut 10 has a CRR wider than an sRGB color gamut 20. If a user selects the first shortcut key 111 in the display apparatus of FIG. 2, the converter 140 matches each point of the sRGB color gamut 20 to each point of the Adobe RGB color gamut 10. More specifically, a pixel of (x', y') corresponding to (R, G, B)=(255, 0, 0) is matched to (x, y). Other pixels of the sRGB color gamut 20 are matched to corresponding points of the Adobe RGB color gamut 10. Such a color converting process may be implemented using a wide range of color converting algorithms, and more specifically, by using a color converting method disclosed in Korean Patent Laid-open No. 2004-85470.

Figure 4:
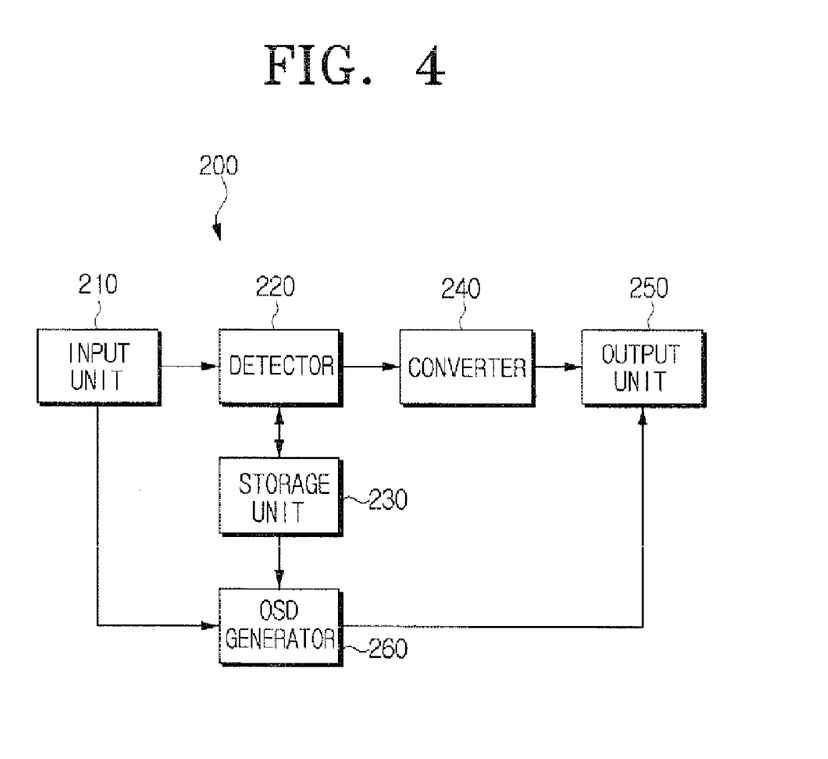
FIG. 4 is a block diagram illustrating the configuration of a display apparatus according to another exemplary embodiment of the present invention.

FIG. 4 is a block diagram illustrating the configuration of a display apparatus according to another exemplary embodiment of the present invention. In FIG. 4, the display apparatus 200 comprises an input unit 210, a detector 220, a storage unit 230, a converter 240, an output unit 250 and an on screen display (OSD) generator 260.

The input unit 210 comprises a shortcut key to select a color gamut profile, and the detector 220 detects the selected color gamut profile from the storage unit 230. The converter 240 converts image data according to the detected color gamut profile, and the output unit 250 outputs the image data on the screen.

If the shortcut key on the input unit 210 is selected, the OSD generator 260 generates an OSD for selecting a color gamut profile and displays the OSD through the output unit 250. Accordingly, a user can easily select one of a plurality of color gamut profiles.

Figure 5:
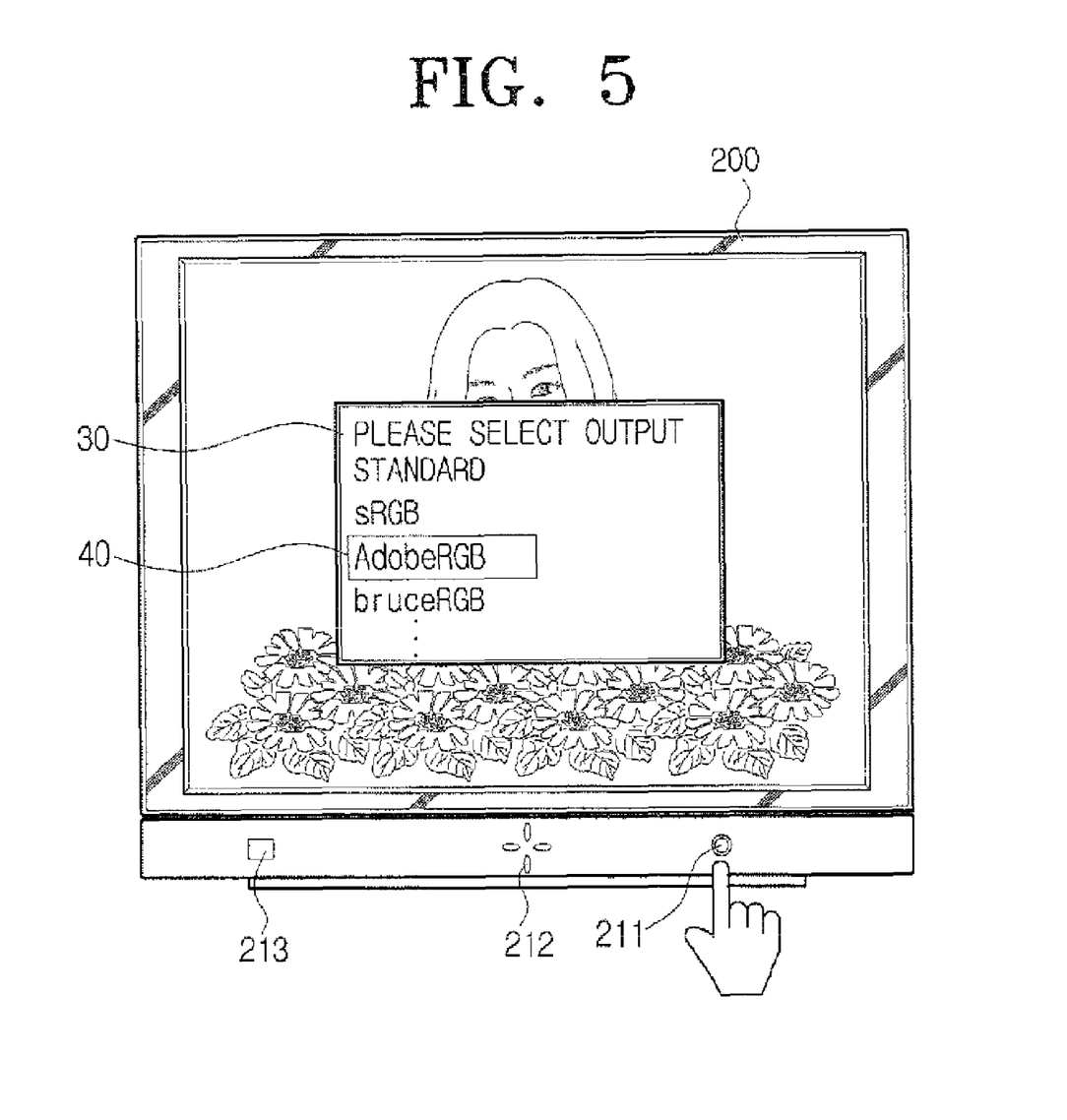
FIG. 5 is a view provided for describing an example of the process of selecting an output standard in the display apparatus of FIG. 4.

FIG. 5 is a view for describing the process of selecting a color gamut profile in the display apparatus 200 of FIG. 4. In FIG. 5, the display apparatus 200 comprises not only a power key 213 and a direction adjusting key 212, which are generally provided, but also one more shortcut key 211. If a user presses the shortcut key 211, an OSD 30 is displayed on the screen of the display apparatus 200 in order for the user to select a color gamut profile. The OSD 30 comprises the color gamut profiles stored in the storage unit 230. Additionally, the OSD 30 comprises a cursor 40 which can be moved using the direction adjusting key 212 to select a desired color gamut profile. If the user presses the shortcut key 211 again, a color gamut profile where the cursor 40 is located may be regarded to have been selected by the user. The direction adjusting key 212 may be a sound adjusting key or a channel adjusting key. As shown in FIG. 5, the plurality of color gamut profiles can be efficiently selected using the single shortcut key 211.

FIGS. 2 and 5 illustrate the external panels of the display apparatus 100 and 200 provided with the shortcut keys, but the shortcut keys may be provided on a remote control (not shown) or in a touch screen format.

Figure 6:
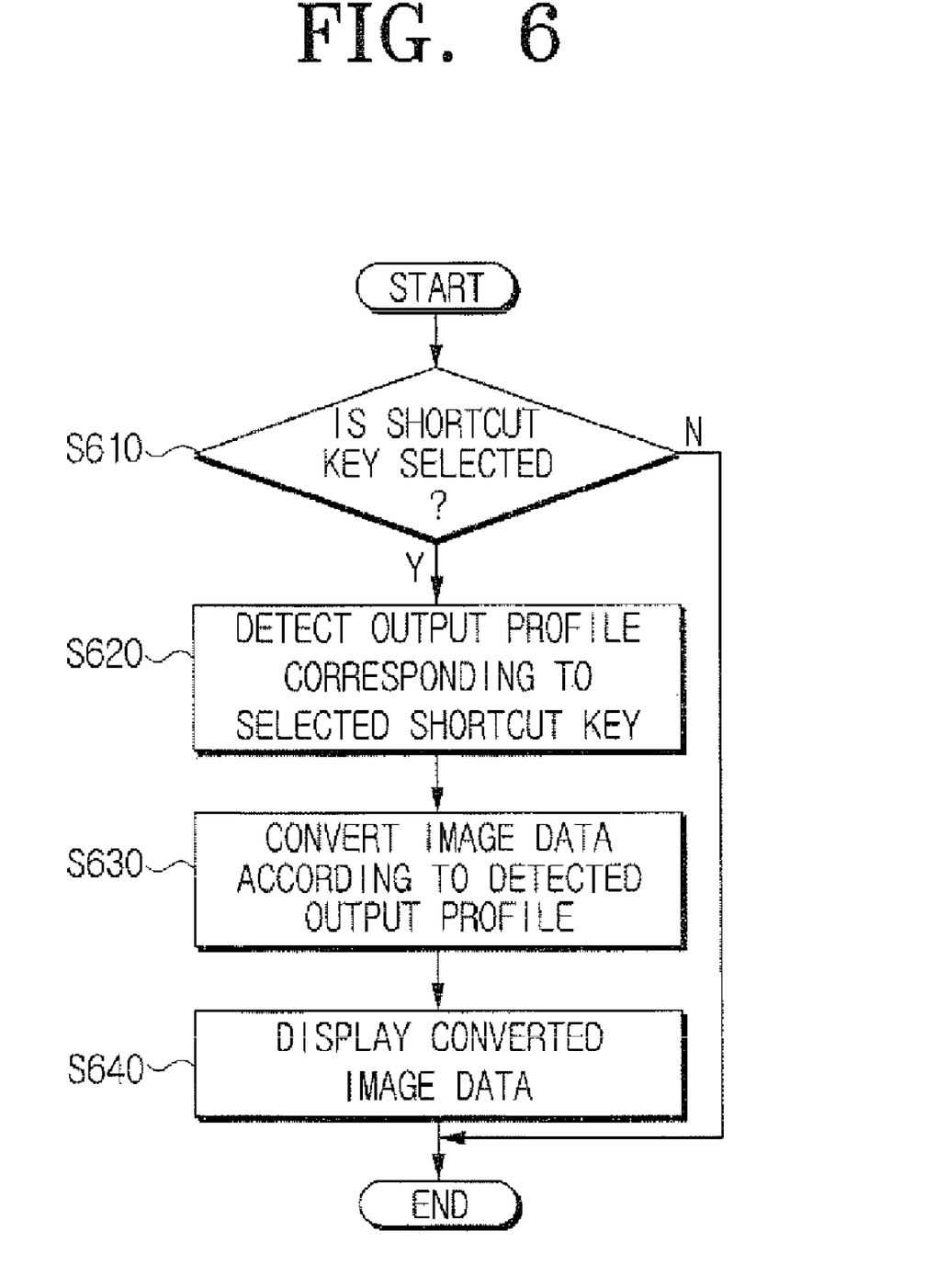
FIG. 6 is a flow chart illustrating an image processing method according to an exemplary embodiment of the present invention.

FIG. 6 is a flow chart illustrating an image processing method according to an exemplary embodiment of the present invention. In FIG. 6, if a shortcut key is selected in operation S610, a color gamut profile corresponding to the selected shortcut from among pre-stored color gamut profiles is detected in operation S620. To do so, shortcut keys corresponding to each of the color gamut profiles are provided on an external panel of the display apparatus 100, as shown in FIG. 2.

If the color gamut profile is detected, image data are converted according to the color gamut profile in operation S630. Subsequently, the converted image data are displayed on the screen in operation S640.

Figure 7:
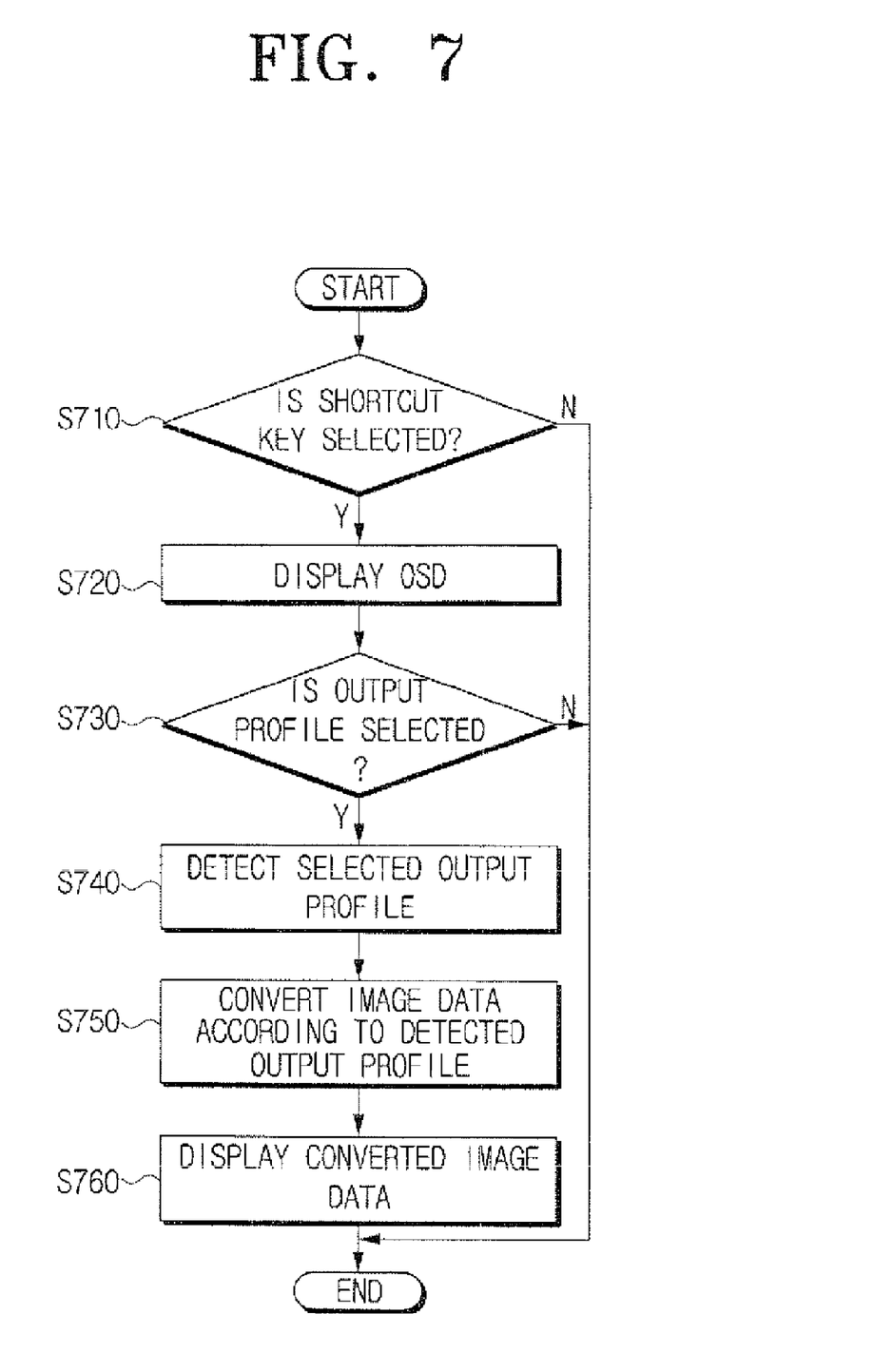
FIG. 7 is a flow chart illustrating an image processing method according to another exemplary embodiment of the present invention.

FIG. 7 is a flow chart illustrating an image processing method according to another exemplary embodiment of the present invention. In FIG. 7, if a shortcut key is selected in operation S710, an OSD is displayed in operation S720. As shown in FIG. 5, the OSD may comprise the pre-stored color gamut profiles.

Subsequently, if a color gamut profile is selected from the OSD in operation S730, the color gamut profile is detected from the pre-stored color gamut profiles in operation S740, and image data are converted according to the color gamut profile in operation S750. Finally, the converted image data are displayed on the screen in operation S760.

The converted image data may be expressed on the screen by adjusting optical power of each color LED constituting the LED light source. The features of the LED light source and the adjusting method thereof is described above, so detailed description is omitted.

Alternatively, the display apparatus may be implemented by having a single shortcut key. Accordingly, whenever the shortcut key is selected, the pre-stored color gamut profiles are detected one after another to be applied for image conversion.

Figure 8:
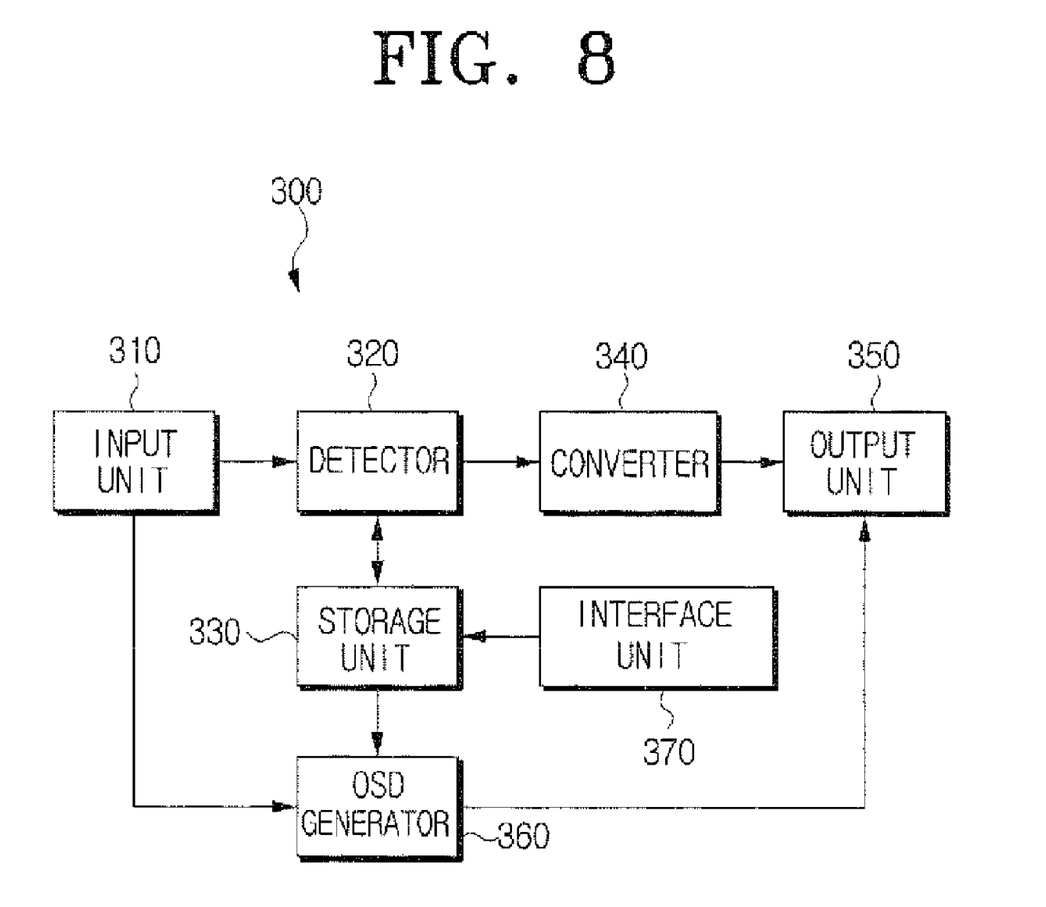
FIG. 8 is a block diagram illustrating the configuration of a display apparatus according to yet another exemplary embodiment of the present invention.

FIG. 8 is a block diagram illustrating the configuration of a display apparatus according to yet another exemplary embodiment of the present invention. In FIG. 8, the display apparatus 300 comprises an input unit 310, a detector 320, a storage unit 330, a converter 340, an output unit 350, an OSD generator 360 and an interface unit 370. Among the elements constituting FIG. 8, detailed description of elements overlapping FIGS. 1 and 4 are omitted.

The interface unit 370 connects the display apparatus 300 to an external device. As a result, information regarding color gamut profiles and the like may be downloaded from the external device.

The storage unit 330 stores the information regarding color gamut profiles downloaded from the external device.

The OSD generator 360 displays an OSD by applying the changed information regarding color gamut profiles stored in the storage unit 330. That is, if there is a newly downloaded color gamut profile, it is added and displayed on the OSD.

A user selects a color gamut profile from the OSD using a shortcut key provided on the input unit 310, so the user can view images according to the desired color gamut profile.

As can be appreciated from the above description, a user can view images by altering the color gamut profile in a more convenient manner such as using a shortcut key.

Additionally, hardware limitations can be eliminated by using only a few shortcut keys. In particular, color gamut profiles such as Adobe RGB can be easily selected using an LED light source. Consequently, the exemplary embodiments of the present invention may enhance a user's convenience.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A display apparatus, comprising:
at least one shortcut key;
an input unit which receives a color gamut profile selection;
a storage unit which stores at least one color gamut profile capable of being expressed by the display apparatus;
a detector which detects a color gamut profile from the storage unit in response to the color gamut profile selection received by the input unit;
a converter which converts image data based on the detected color gamut profile; and
an output unit which displays the converted image data,
wherein the display apparatus further comprises an LED light source comprising a plurality of red (R), green (G), and blue (B) LED light sources, and the output unit displays the converted image data by adjusting the optical power of the plurality of R, G, and B LED light sources,
wherein the color gamut profile is information to determine the output features when outputting an image,
wherein the input unit receives the color gamut profile selection in response to a user's activation of the at least one shortcut key,
wherein the detector successively detects one of the at least one color gamut profile stored in the storage unit, one after another, in response to a shortcut key from among the at least one shortcut key being repetitively selected.

2. The display apparatus of claim 1, wherein the detector detects the color gamut profile corresponding to a shortcut key from the storage unit if the shortcut key is selected from among the at least one shortcut key.

3. The display apparatus of claim 2, wherein the storage unit stores at least two color gamut profiles from at least two of a standard RGB (sRGB) profile, a Bruce RGB profile, a Commission Internationale de l'Eclairage (CIE) RGB profile, and the Adobe RGB profile.

4. The display apparatus of claim 3, wherein the input unit comprises at least two shortcut keys corresponding to the at least two color gamut profiles stored in the storage unit.

5. The display apparatus of claim 1, further comprising an on screen display (OSD) generator which generates an OSD to display the at least one color gamut profile to apply when outputting the image data and displays the OSD using the output unit, if the shortcut key is selected,
wherein the detector detects a color gamut profile from among the at least one color gamut profile if the color gamut profile is selected from the OSD.

6. The display apparatus of claim 1, wherein the storage unit stores an Adobe RGB profile.

7. The display apparatus according to claim 1, further comprising an interface unit which connects the display apparatus to an external device,
wherein the interface unit is configured to download color gamut profile information from the external device.

8. The display apparatus according to claim 7, wherein the storage unit stores the color gamut profile information downloaded from the external device.

9. A method for processing an image in a display apparatus, comprising:
(a) selecting a color gamut profile using an input unit;
(b) detecting the selected color gamut profile from a storage unit which stores at least one color gamut profile capable of being displayed by the display apparatus;
(c) converting image data based on the detected color gamut profile; and
(d) displaying the converted image data,
wherein the display apparatus further comprises an LED light source comprising a plurality of R, G, and B LED light sources, and in step (d), the converted image data are displayed by adjusting the optical power of the plurality of R, G, and B LED light sources,
wherein the color gamut profile is information to determine the output features when outputting an image,
wherein the color gamut profile is selected using at least one shortcut key,
wherein in step (b), the at least one color gamut profile stored in the storage unit are detected sequentially, in response to a shortcut key being selected from among the at least one shortcut key in succession.

10. The method of claim 9, wherein the storage unit stores at least one color gamut profile corresponding to the at least one shortcut key, and in step (b), a color gamut profile corresponding to a shortcut key is detected from the storage unit if the short cut key is selected from among the at least one shortcut key.

11. The method of claim 10, wherein the storage unit stores at least two color gamut profiles from at least two of an sRGB profile, a Bruce RGB profile, a CIE RGB profile and the Adobe RGB profile, and the display apparatus comprises at least two shortcut keys corresponding to the at least two color gamut profiles.

12. The method of claim 9, wherein step (a) further comprises displaying an OSD to select a color gamut profile to apply when outputting the image data, in response to a shortcut key being selected from among the at least one shortcut key; and displaying a cursor on the OSD and selecting a color gamut profile by locating the cursor on one of the at least color gamut profiles, and in step (b), the color gamut profile selected on the OSD is detected from the storage unit.

13. The method of claim 9, wherein the storage unit stores an Adobe RGB profile.

14. The method of claim 9, further comprising:

(e) downloading color gamut profile information using an interface unit which connects the display apparatus to an external device;

storing the downloaded color gamut profile information in the storage unit.

* * * * *